Patented Feb. 24, 1953

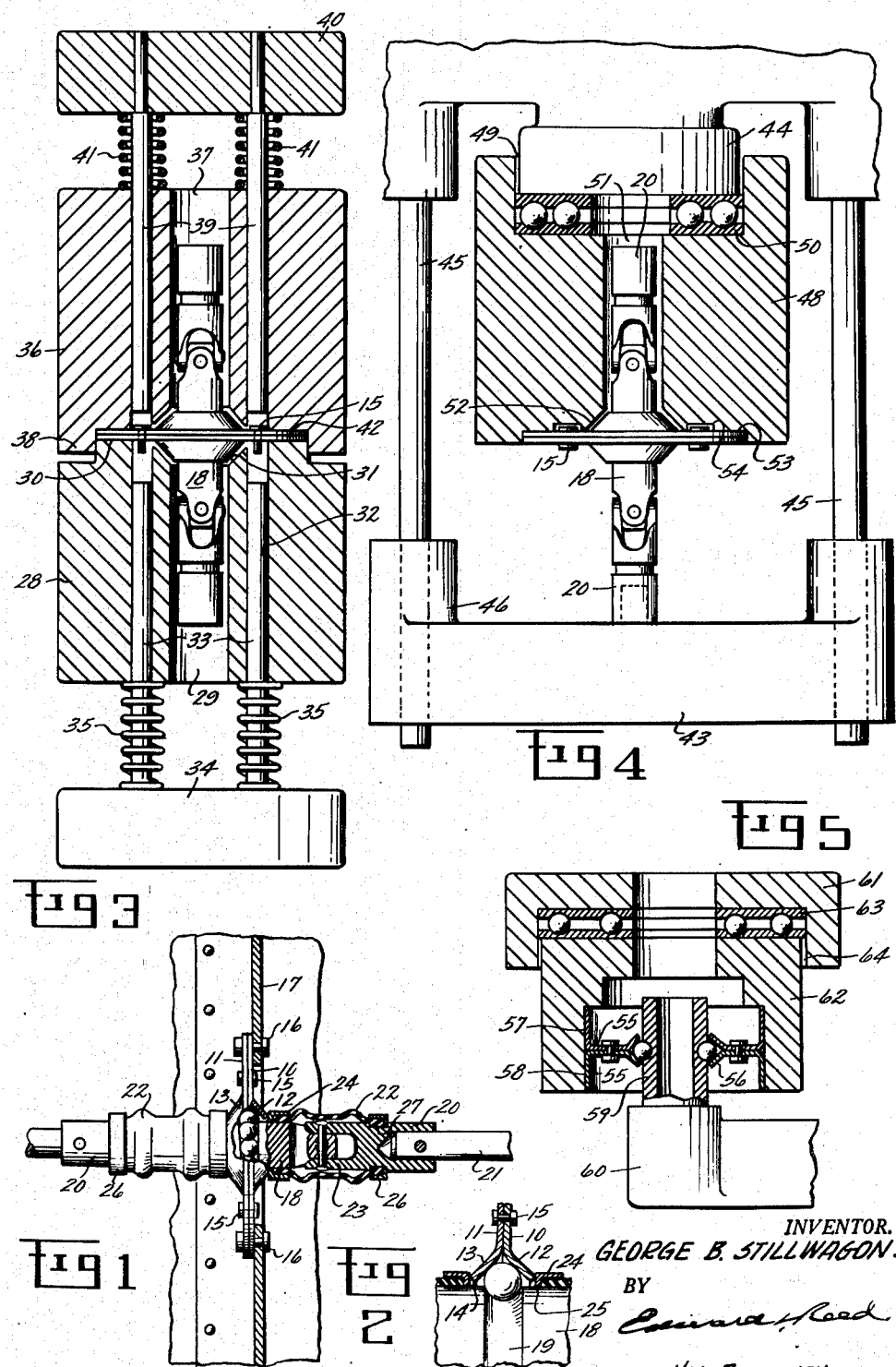

2,629,165

UNITED STATES PATENT OFFICE 2,629,165

METHOD OF PRODUCING SHEET METAL BEARINGS

George B. Stillwagon, Jr., Dayton, Ohio, assignor of one-half to Kenneth G. Fraser, Dayton, Ohio Application May 31, 1947, Serial No. 751,527

1 Claim. (Cl. 29—148.4)

This invention relates to a bearing and to the method of producing the same.

One object of the invention is to provide a bearing which is simple and inexpensive in construction and has ample strength and rigidity for its intended purpose.

A further object of the invention is to provide a sheet metal bearing having a ball race which moves smoothly and freely on the balls.

A further object of the invention is to provide a method by which a bearing may be made of sheet metal parts and quickly and easily assembled.

A further object of the invention is to provide a method of forming a ball bearing of sheet metal and assembling the same with the balls and the member which is to rotate therein.

A further object of the invention is to provide a method by which the ball race of a sheet metal bearing may be quickly and easily conformed to the balls on which it is mounted.

Other objects of the invention may appear as the invention is described in detail.

In the accompanying drawings Fig. 1 is a sectional view, partly in elevation, of a bearing embodying the invention with the rotatable member mounted therein; Fig. 2 is a fractional detail view of a portion of the bearing; Fig. 3 is a sectional view taken centrally through a device for carrying out the assembling method, and partly in elevation; Fig. 4 is a side elevation, partly in section, of a device for conforming the ball race of the bearing to the balls; and Fig. 5 is a sectional view, partly in elevation, of a modified form of the bearing and a modified device for conforming the ball race thereof to the balls.

The bearing comprises two thin metallic members rigidly connected one to the other, provided with alined openings and with outwardly diverging parts arranged in opposed relation to form a ball bearing adapted to receive a rotatable member having a ball race.

In the particular embodiment shown in Figs. 1 and 2 the bearing comprises two circular sheet metal plates 10 and 11, having opposed outwardly extending frusto-conical portions 12 and 13, provided with alined openings 14 to receive a rotatable member, the frusto-conical members forming between them a ball race. The plates are provided with alined openings spaced radially from the frusto-conical portions thereof to receive rivets 15 which rigidly secure the two plates one to the other, and they are also provided with other alined openings to receive the rivets 16 by which the bearing is secured to a supporting structure, such as a partition or bulkhead 17. The device to be rotated is here shown as the intermediate member 18 of a double universal joint. The member 18 is provided with a circumferential ball race 19 which is alined with the ball race formed between the frusto-conical members 12 and 13. The intermediate member 18 extends axially beyond the frusto-conical members of the bearing and has secured to each end thereof an end member, or barrel 20, having means whereby a shaft 21 may be secured thereto. Each end member is connected with the intermediate member 18 for movement with relation thereto about intersecting transverse axes, the connection being here shown at 23 as of the jaw type, which is well known in universal joints. It is desirable to provide a universal joint with a flexible cover, as shown at 22, to exclude dirt and to contain a lubricant and each of the two joints of the present device is provided with such a cover. Each cover 22 is tubular in form and is mounted about the pivotal connection between the two parts of the joint. Usually both ends of the cover are rigidly secured to the respective parts of the joint. In the present arrangement the inner end of the cover is secured to the adjacent portion of the rotatable member 18 by a band 24 having an inturned annular flange 25 which bears against the end of the frusto-conical portion of the adjacent bearing member. The band grips the end of the cover tightly enough to retain it in place but permits a slight axial movement of the end of the cover and of the band. The outer end of the cover is secured to the barrel 20 by a similar band 26 the flange of which extends into the circumferential groove 27 in the barrel and locks the cover to the barrel. The distance between the groove 27 and the bearing is somewhat less than the extended length of the tubular cover and in attaching the cover to the barrel the band 26 is placed about the outer portion of the barrel and about the end of the cover and is then pressed inwardly to bring the flange into line with the groove 27, and is then radially compressed to press the end portion of the cover into the groove and to also press the radial flange into the groove and thus lock the cover rigidly to the barrel. The longitudinal pressure thus exerted upon the cover places the same under compression and causes it to buckle. The tendency of the cover to return to its extended position presses the band 24 at the inner end of the cover against the outer end of the adjacent frusto-conical portion of the bearing, thereby maintaining a snug and substantially sealed connection between the cover and the bearing but permitting the cover to rotate with the rotatable member.

In assembling the bearing, after the bearing members or plates have been formed, one of the bearing members is supported in an approximately horizontal position with the frusto-conical portion thereof extending downwardly and one end of the rotatable member is inserted through the opening in the bearing member and the balls are inserted in the race in the rotatable member so that when the latter is released the balls are retained in the race and the further downward movement of the rotatable member is prevented. The second bearing member is then superposed on the first mentioned bearing member, the rivets placed in position therein and the rivets subjected to the action of a riveting device to upset the same and rigidly connect the two members of the bearing. These operations may be carried out in any suitable manner but there is shown in Fig. 3 an apparatus by which the assembling and riveting of the bearing is very quickly and efficiently performed.

As here shown this assembling device comprises a lower clamping member 28 having therein a longitudinal bore 29 adapted to receive the lower barrel and one end portion of the rotatable member 18. Surrounding this bore is an upwardly extending annular projection or flange 30 having a flat upper surface adapted to receive and support one of the bearing members, the member 28 also being provided at the upper end of the bore 29 with a recess 31 to receive the frusto-conical portion of the bearing member. The member 28 is also provided with a plurality of parallel bores 32 in which are slidably mounted plungers 33. These plungers extend downwardly beyond the member 28 and are rigidly secured to a pressure member or block 34. Springs 35 coiled about the plungers and confined between the lower end of the clamping member 28 and the pressure member 34 retract the plungers and retain the same normally in their retracted positions with the upper ends thereof spaced from the upper ends of the respective bores. The device also includes an upper clamping member 36 which is supported on and is removable from the lower clamping member. This upper clamping member is also provided with a longitudinal bore 37 to receive the other end of the rotatable member and its barrel and is provided with a downwardly projecting annular member or flange 38 of an internal diameter approximating the external diameter of the upwardly extending projection 30, which is substantially the diameter of the bearing. The upper clamping member is also provided with longitudinal bores in which are slidably mounted plungers 39 which project upwardly beyond the clamping member 36 and are rigidly secured to an upper pressure member 40, and springs 41 press the pressure member 40 upwardly and thus retract the plungers 39 and support the same normally with their lower ends spaced from the lower ends of the respective bores.

In assembling the bearing one member thereof is placed on the upwardly projecting part 30 of the lower member with its frusto-conical portion in the recess 31. The rotatable member is then inserted through the opening in the frusto-conical portion and the balls introduced into the race in the rotatable member, as above mentioned. The second bearing member is then superposed on the first mentioned member with its frusto-conical portion in opposed relation to the frusto-conical portion of said first mentioned member and with its rivet holes in line with the rivet holes in said first mentioned member. The rivets 15 are then inserted in the rivet holes with their heads uppermost and the upper clamping member 36 is placed in position on the lower member 28 and with the shoulder 42, formed at the upper end of the flange 38, in contact with the upper bearing member. When thus loosely assembled the plates are held in proper alinement by the cooperating parts of the two clamping members and the rivet heads extend into the bores in the upper clamping member and the shanks or lower ends of the rivets extend into the bores in the lower clamping member. It is obvious, however, that the two bearing members may be superposed one on the other, with the balls between them and with the rivets in the rivet holes, and the loosely assembled bearing then placed on the lower clamping member and the upper clamping member placed in position on the lower clamping member. The assembling and riveting device, thus assembled, is then placed in a suitable press, such as a power press or a vise, and the two pressure heads 34 and 40 are subjected to pressure in opposite directions, thereby clamping the bearing members between the clamping members, and moving both sets of plungers toward the rivets. It will be noted that in their normal positions the plungers 39 are spaced from the rivet heads a distance somewhat less than the distance which the plungers 33 are spaced from the lower ends of the rivets. Consequently, the upper plungers will first engage the rivet heads and will hold the rivets against movement when the lower ends thereof are engaged and upset by the lower plungers thus tightly setting the rivets. At the end of the riveting operation the assembling and riveting device is removed from the press and the upper clamping member removed to permit the removal of the fully assembled and riveted bearing. Thereafter other bearings are successively assembled and riveted in the same manner. The operation is a simple one and can be quickly performed, thereby enabling the bearing to be assembled with the rotatable member and balls quickly and at small expense.

When the bearing members are formed by a stamping and forming operation it is not feasible to so form the frusto-conical portions of the bearing members that when assembled they will have the desired smooth free running contact with the balls. Therefore the relation of the opposed frusto-conical portions is such that, when the two bearing members have been rigidly connected one with the other, the frusto-conical members will be in firm contact with the balls. In order to conform the bearing surfaces of the bearing members to the balls and to release the same for free rotation thereon, the rotatable member is held against rotation and axial pressure is exerted on the bearing in a direction to press one of the frusto-conical members firmly against the balls. Rotatory movement is then imparted to the bearing about the axis of the rotatable member, first in one direction and then in the other direction, while the axial pressure is maintained to gradually conform that bearing surface to the balls. When the bearing moves freely on the balls the pressure is relieved, the bearing reversed, and the pressure exerted on the bearing in the opposite direction to press the other frusto-conical member against the balls, and rotatory movement is again imparted to the bearing to conform the second bearing surface to the balls. When this is completed the ball race has smooth and free running contact with the balls.

This conforming operation may be effected with mechanisms of various kinds but the apparatus shown in Fig. 4 is simple, easily operated and efficient. As there shown the apparatus comprises a lower pressure member 43 and an upper pressure member 44, the two members having opposed surfaces. One or both of the pressure members may be actuated in any suitable manner, as by placing the device in a vise or press. As here shown guide rods 45 are rigidly connected with the member 44 and are slidable in guideways 46 in the pressure member 43. Arranged between the two pressure members is a head 48, here shown as substantially cylindrical, which is provided in one end with a recess 49 adapted to receive the upper pressure member 44, which is preferably cylindrical in form, and to rotate about the axis of that pressure member. Preferably a ball bearing 50 is interposed between the base of the recess 49 and the upper pressure member. The rotatable head 48 is provided with an axial recess or bore 51 to receive the end of the rotatable member 18 and its barrel 20, that end of the bore opposite the pressure member 44 being flared to receive a frusto-conical portion of the bearing as shown at 52. The head is also provided at that end opposite the pressure member with a shallow recess 53 to receive the flat portion of the bearing and is also preferably provided with small recesses 54 to receive the rivets of the bearing so that the latter can have snug contact with the base of the recess 53. The end member or barrel 20 at that end of the rotatable member opposite the upper pressure member has flat contact with the lower pressure member and when pressure is exerted on the bearing by the pressure members the rotatable member is pressed tightly against the lower pressure member and held against rotation, and the bearing itself is subjected to pressure to press the bearing surface of that frusto-conical portion of the bearing which is in the recess 52 against the balls in the race of the rotatable member 18. While this pressure is maintained the rotatable head is rotated first in one direction and then in the other to conform the bearing surface to the balls. In small bearings the rotatable head is of a size which permits it to be gripped by the hand and operated, but if desired the head may be provided with suitable means for manipulating the same. When the operation has been completed the upper pressure member is retracted, the rotatable head is removed therefrom and the bearing and rotatable member 18 are removed from the head, reversed and again inserted in the rotatable head and the operation then repeated to conform the second frusto-conical bearing surface to the balls.

The bearing above described is designed primarily for mounting on a bulkhead or partition but this is not essential and the bearing may take various forms and may be mounted in various ways. In Fig. 5 there is shown a slightly different form of bearing in which the bearing members or plates 55 and 56 are provided with opposed faces rigidly connected one with the other and are also provided with frusto-conical portions 56 to form the ball race, but the peripheral portions of the bearing plates are turned to positions substantially parallel with the axis of the bearing and extending in opposite directions, as shown at 57 and 58, so that the bearing is provided with a circumferential surface of substantial axial length whereby it may be mounted on a suitable support, or it may be utilized as a pulley to be mounted on a stationary shaft. Such a bearing may be mounted on a shaft of any suitable kind having the necessary ball race, the shaft being here shown as a short tubular section 59 which could be either a portion of the shaft itself or a sleeve adapted to be mounted on the shaft.

This modified bearing is shown in connection with a conforming device operated in the same manner as the device of Fig. 4 but slightly different in construction. The lower pressure member is shown at 60 and the upper pressure member is shown at 61 as cup-shape in form to receive one end of the rotatable head 62, the ball bearing 63 being mounted in the pressure member 61. The recess 64 in the rotatable head is of a size and axial length to receive a bearing of the type here shown. The pressure members may be guided and subjected to pressure in the manner shown in Fig. 4, or in any suitable manner.

While I have shown and described one form of the bearing, and a minor modification thereof, and a method of producing the bearing, I wish it to be understood that I do not desire to be limited to the details thereof as various modifications may occur to a person skilled in the art.

Having now fully described my invention what I claim to be new and desire to secure by Letters Patent is:

The method of producing a bearing comprising the steps of forming each of two plates with an opening therethrough and with a frusto-conical portion surrounding said opening, supporting one of said plates in a substantially horizontal position, inserting in the opening of said plate a vertically disposed cylindrical member having therein a ball race, inserting a series of balls in the frusto-conical portion and in said race, mounting the other of said plates on said cylindrical member with its frusto-conical portion opposed to the frusto-conical portion of the first mentioned plate and in contact with said balls, clamping the margins beyond the frusto-conical portions of the plates so as to force the frusto-conical portions thereof in firm contact with the balls, rigidly securing the margins of the plates while clamped together, supporting the assembled structure with one end of said cylindrical member in engagement with a support, subjecting the margin of the plate further removed from the support to axial pressure upon said cylindrical member in the direction of the support, and simultaneously rotating the plates with respect to the cylindrical member, reversing the cylindrical member and the plates with respect to the support and subjecting the other plate to pressure towards the support and simultaneously rotating the plates with respect to the cylindrical member.

GEORGE B. STILLWAGON, Jr.

(References on following page)

REFERENCES CITED

The following references are of record in the file of this patent:

UNITED STATES PATENTS

| Number | Name | Date |
|---|---|---|
| 756,404 | Polte | Apr. 5, 1904 |
| 781,710 | Bright | Feb. 7, 1905 |
| 1,000,272 | Lloyd | Aug. 8, 1911 |
| 1,320,096 | Rouanet | Mar. 28, 1919 |
| 1,456,079 | Steubner | May 22, 1923 |
| 1,459,858 | Parsons | June 26, 1923 |
| 1,627,558 | Grunwald | May 10, 1927 |
| 1,663,629 | Fritzsching | Mar. 27, 1928 |
| 1,677,841 | Nice | July 17, 1928 |
| 1,742,840 | Wing | Jan. 7, 1930 |
| 1,749,281 | Hambleton | Mar. 4, 1930 |
| 1,805,124 | Wilcox | May 12, 1931 |
| 1,954,545 | Uline | Apr. 10, 1934 |
| 1,976,019 | Heim | Oct. 9, 1934 |
| 2,057,692 | Rehnberg | Oct. 20, 1936 |
| 2,112,754 | Annen | Mar. 29, 1938 |
| 2,223,799 | Annen | Dec. 3, 1940 |
| 2,248,590 | Smith | July 8, 1941 |
| 2,298,379 | Hoffman | Oct. 13, 1942 |
| 2,315,357 | Smith | Mar. 30, 1943 |
| 2,318,191 | Bloomfield | May 4, 1943 |
| 2,330,741 | Potter | Sept. 28, 1943 |
| 2,425,809 | Johnson | Aug. 19, 1947 |